United States Patent
Sugita et al.

(10) Patent No.: US 10,429,609 B2
(45) Date of Patent: Oct. 1, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventors: Shigenobu Sugita, Shimotsuke (JP); Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 15/607,140

(22) Filed: May 26, 2017

(65) Prior Publication Data

US 2017/0351058 A1 Dec. 7, 2017

(30) Foreign Application Priority Data

Jun. 1, 2016 (JP) ................. 2016-109659

(51) Int. Cl.
| G02B 9/10 | (2006.01) |
| G02B 15/16 | (2006.01) |
| G02B 27/00 | (2006.01) |
| G02B 13/02 | (2006.01) |
| G02B 13/16 | (2006.01) |

(52) U.S. Cl.
CPC ............ G02B 9/10 (2013.01); G02B 13/02 (2013.01); G02B 13/16 (2013.01); G02B 15/161 (2013.01); G02B 27/0025 (2013.01)

(58) Field of Classification Search
CPC ... G02B 9/10; G02B 9/12; G02B 9/14; G02B 15/16; G02B 15/161; G02B 15/173; G02B 13/02; G02B 13/0035; G02B 27/00; G02B 27/0025; G02B 26/08; G02B 13/16

USPC ....... 359/692, 689, 716, 690, 748, 753, 784, 359/785, 786, 788

See application file for complete search history.

(56) References Cited

U.S. PATENT DOCUMENTS

| 6,115,188 | A | 9/2000 | Nishio et al. |
| 7,609,446 | B2 | 10/2009 | Nanba |
| 7,626,771 | B2 | 12/2009 | Yokoyama |
| 7,894,135 | B2 | 2/2011 | Nanba |
| 7,948,691 | B2 | 5/2011 | Okumura |
| 8,223,436 | B2 | 7/2012 | Sugita |
| 8,314,996 | B2 | 11/2012 | Nanba |
| 8,331,034 | B2 | 12/2012 | Kimura |
| 8,503,095 | B2 | 8/2013 | Kimura |
| 8,681,433 | B2 | 3/2014 | Ono |
| 8,705,180 | B2 | 4/2014 | Takano et al. |
| 9,081,170 | B2 | 7/2015 | Kimura |
| 9,134,512 | B2 | 9/2015 | Iwamoto |
| 9,678,318 | B2 | 6/2017 | Nakamura et al. |
| 9,946,065 | B2 | 4/2018 | Okumura |

(Continued)

FOREIGN PATENT DOCUMENTS

| JP | 2014-026023 A | 2/2014 |
| JP | 2014-56195 A | 3/2014 |

(Continued)

*Primary Examiner* — Jie Lei
(74) *Attorney, Agent, or Firm* — Canon U.S.A., Inc. IP Division

(57) ABSTRACT

In an optical system which includes a positive lens Gp and in which a distance on an optical axis from an object-side lens surface of a lens disposed closest to an object side to an image surface is shorter than a focal length of an entire system, an arrangement and a material of the positive lens Gp, and an arrangement of a focus unit are set appropriately.

13 Claims, 11 Drawing Sheets

(56) References Cited

U.S. PATENT DOCUMENTS

| | | |
|---|---|---|
| 9,983,392 B2 | 5/2018 | Inoue |
| 2006/0209426 A1 | 9/2006 | Suzuki |
| 2011/0080654 A1 | 4/2011 | Okumura |
| 2011/0310486 A1 | 12/2011 | Eguchi |
| 2013/0194487 A1 | 8/2013 | Eguchi |
| 2015/0109519 A1* | 4/2015 | Fujikura ................ G02B 13/02 348/360 |
| 2016/0109690 A1* | 4/2016 | Ogata .................... G02B 13/02 359/557 |
| 2017/0129801 A1 | 5/2017 | Kikkawa et al. |
| 2017/0351060 A1 | 12/2017 | Sugita et al. |
| 2017/0351089 A1 | 12/2017 | Gyoda et al. |

FOREIGN PATENT DOCUMENTS

| | | |
|---|---|---|
| JP | 2015-108814 A | 6/2015 |
| JP | 2015-111254 A | 6/2015 |
| JP | 2015-215560 A | 12/2015 |
| JP | 2015-215561 A | 12/2015 |
| JP | 2016-051100 A | 4/2016 |
| JP | 2016-148707 A | 8/2016 |
| JP | 2016-161644 A | 9/2016 |

\* cited by examiner

OPTICAL SYSTEM AND IMAGE PICKUP APPARATUS INCLUDING THE SAME

BACKGROUND

Field of Art

The disclosure relates to an optical system and an image pickup apparatus including the same. The disclosure is applicable to an image pickup apparatus employing an image pickup element, such as a digital still camera, a video camera, a monitoring camera, and a broadcasting camera, or an image pickup apparatus, such as a camera using a silver-halide film.

Description of the Related Art

A telephoto image pickup optical system in which an optical system having positive refractive power is disposed on an object side, and an optical system having negative refractive power is disposed on an image side is known as an image pickup optical system with a long focal length. The telephoto image pickup optical system is used in a super-telephoto lens of fixed focal length, for example.

In a super-telephoto lens, many lenses are generally disposed on an object side to desirably correct various aberrations. Since the lenses disposed on the object side have large effective diameters, a weight of the entire optical system tends to increase due to an increase in number of lenses disposed on the object side.

Generally, as the focal length increases, an axial chromatic aberration and a magnification chromatic aberration become more notable. Especially, fluctuation in the chromatic aberration upon focusing is notable. Japanese Patent Laid-Open No. 2015-215561 discloses an optical system in which a positive lens and a negative lens are disposed in a focus unit which has negative refractive power and which moves upon focusing, in which a material of high anomalous dispersion is employed as a material for the positive lens, and a material of low dispersion is employed as a material for the negative lens.

In the optical system described in Japanese Patent Laid-Open No. 2015-215561, the focus unit is disposed at a position relatively close to a lens disposed closest to an object. Therefore, effective diameters of lenses included in the focus unit tend to be large. In the optical system described in Japanese Patent Laid-Open No. 2015-215561, a negative lens is disposed in the focus unit to desirably correct a spherical aberration occurring in a positive lens included in the focus unit.

Therefore, in the optical system described in Japanese Patent Laid-Open No. 2015-215561, since the focus unit is constituted by a plurality of lenses having large effective diameters, the focus unit tends to increase in size and the optical system tends to increase in weight.

SUMMARY

The disclosure provides an optical system which is light-weight and of which various aberrations, such as a chromatic aberration, are desirably corrected, and an image pickup apparatus including the optical system.

An aspect of an embodiment is an optical system which includes a positive lens Gp and a focus unit which moves upon focusing and disposed closer to an image side than the positive lens Gp, wherein a front unit disposed closer to an object side than the positive lens Gp has positive refractive power as a whole, and when an Abbe number of a material for the positive lens Gp is defined as vdGp, a partial dispersion ratio of the material for the positive lens Gp is defined as $\theta gF\_Gp$, a distance on an optical axis from an object-side lens surface of the positive lens Gp to an image surface is defined as Dpi, a distance on the optical axis from a lens surface of the optical system closest to the object to the image surface of the optical system is defined as LD, and a focal length of the optical system is defined as f, conditional expressions of:

$LD/f < 1.00;$ $15.0 < vdGp < 24.0;$ $0.020 < \theta gF\_Gp - 0.6438 + 0.001682 \times vdGp < 0.100;$ and $0.35 < Dpi/LD < 0.80;$ are satisfied.

Further features of the present invention will become apparent from the following description of exemplary embodiments with reference to the attached drawings.

DESCRIPTION OF THE EMBODIMENTS

Hereinafter, an optical system of an embodiment and an image pickup apparatus including the optical system are described in detail with reference to the appended drawings. The optical system of the embodiment is a telephoto optical system in which a distance on an optical axis from an object-side lens surface of a lens disposed closest to an object to an image surface is shorter than a focal length of an entire system. The optical system of the embodiment includes a positive lens Gp, and a front unit having positive refractive power as a whole, that is disposed on the object side of the positive lens Gp. A focus unit which moves upon focusing is disposed on an image side of the positive lens Gp.

Figure 1:
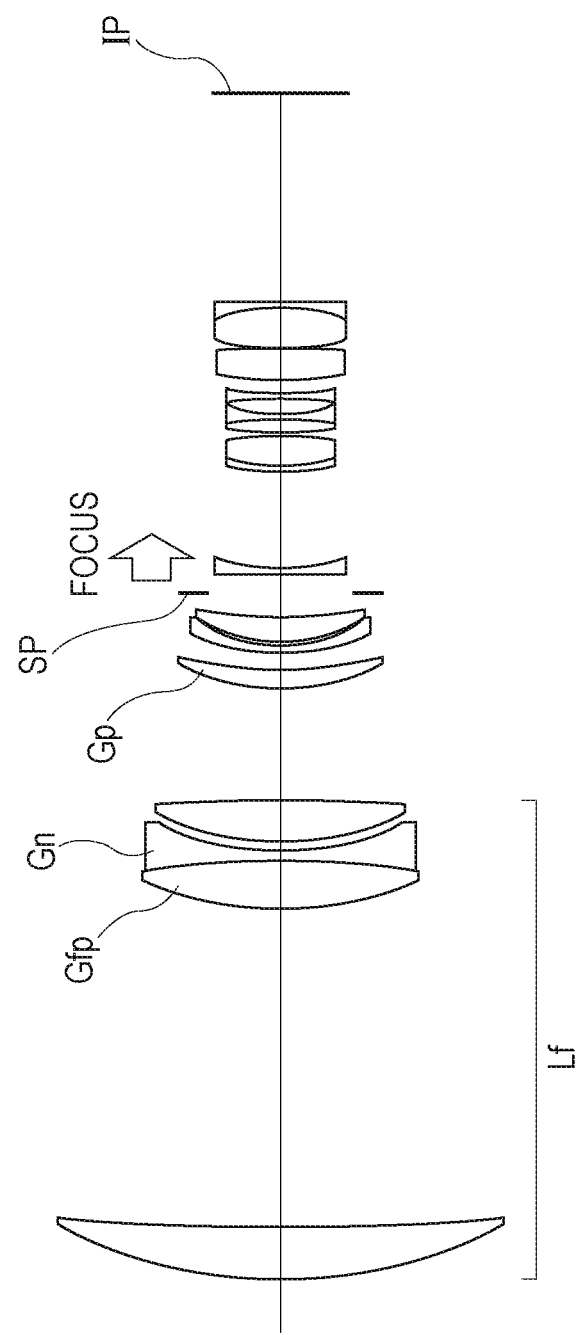
FIG. 1 is a cross-sectional view of lenses of an optical system according to a first embodiment.
Figure 2:
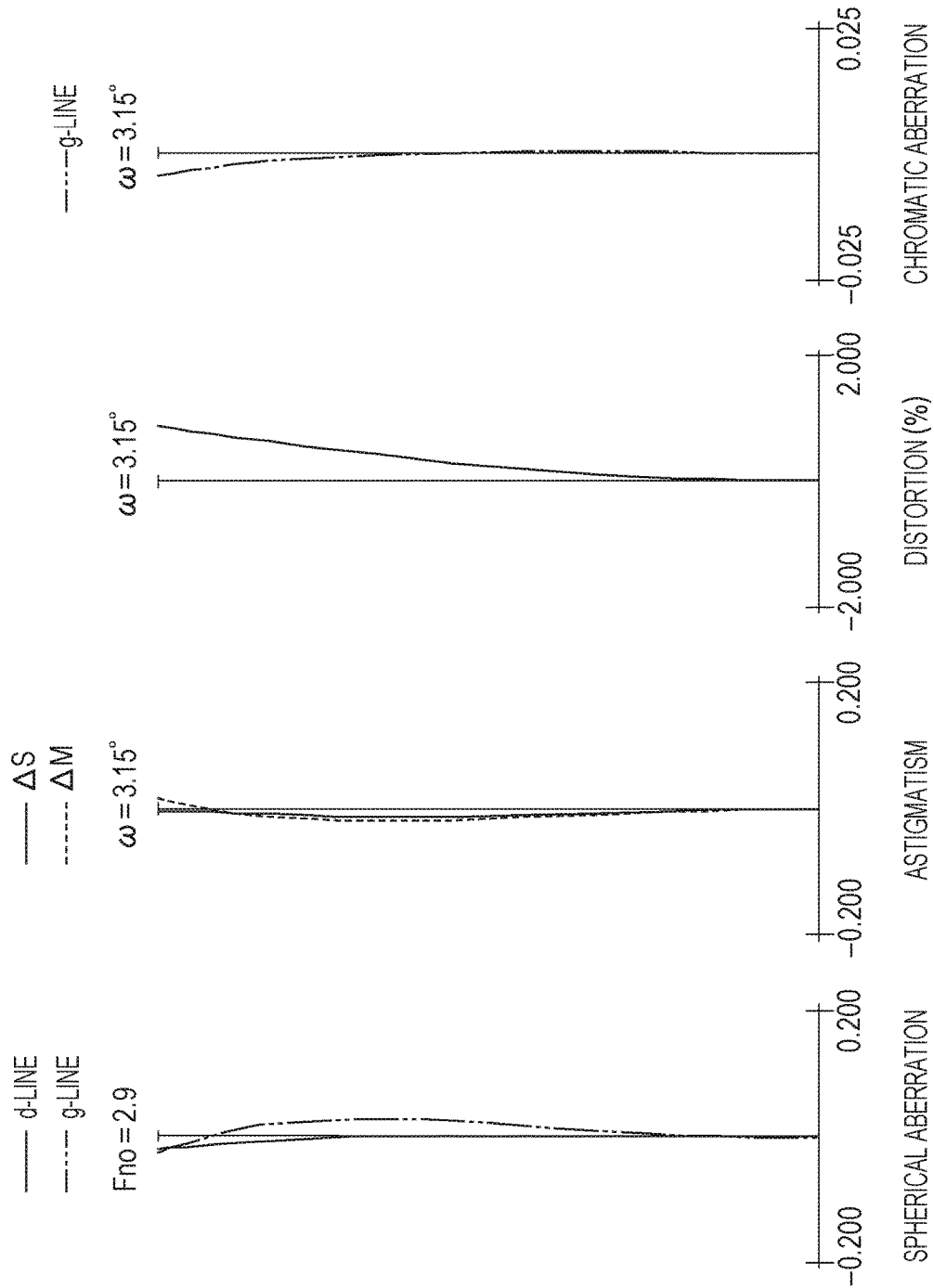
FIG. 2 is an aberration chart of the optical system according to the first embodiment when focusing at infinity.
Figure 3:
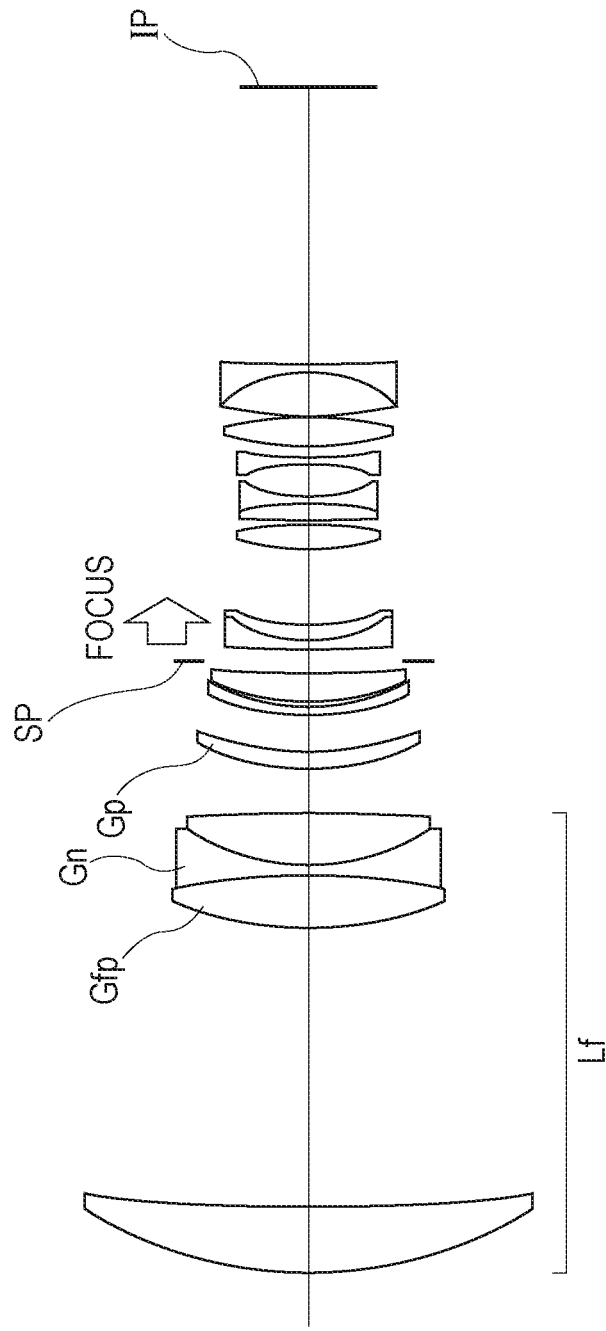
FIG. 3 is a cross-sectional view of lenses of an optical system according to a second embodiment.
Figure 4:
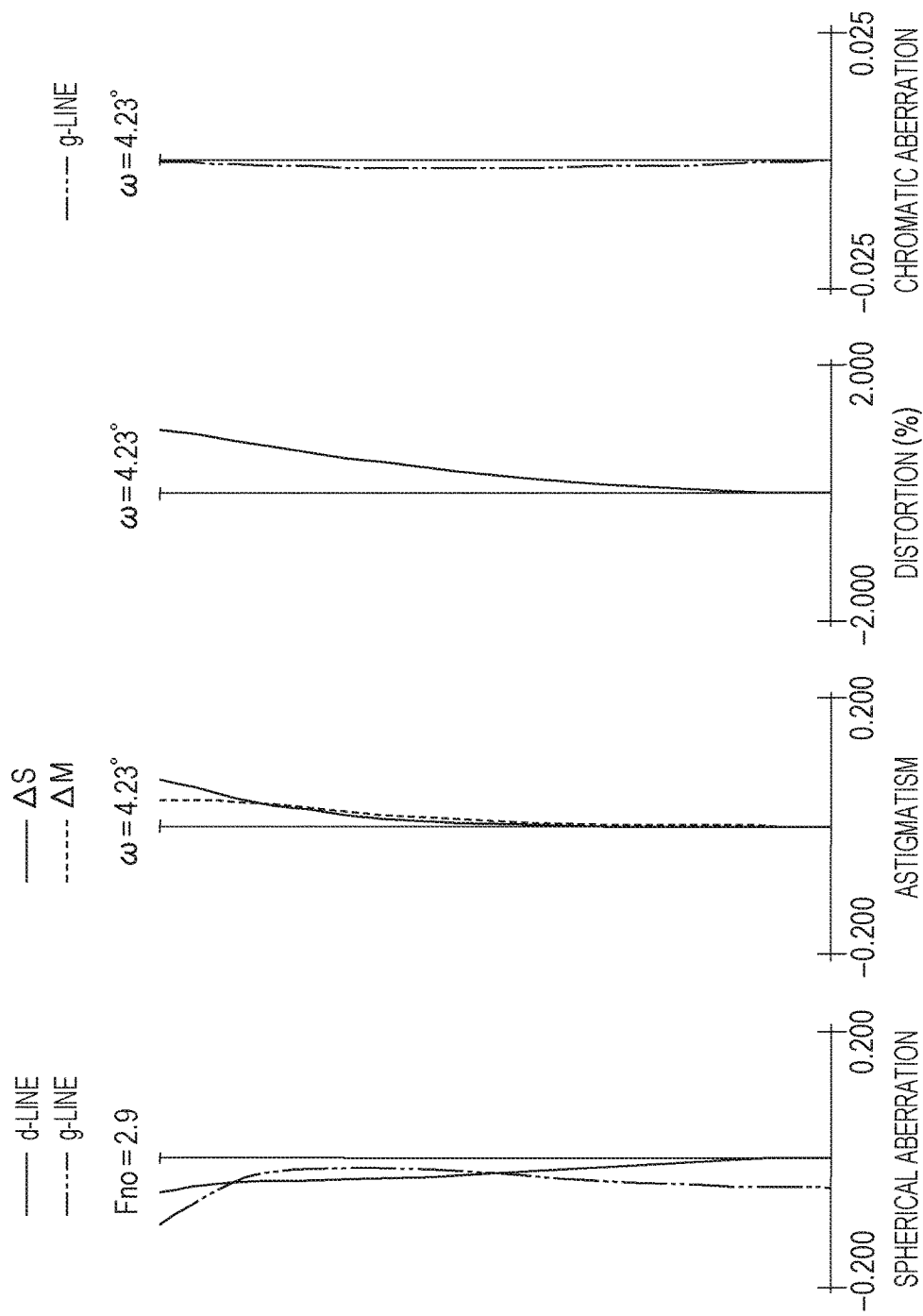
FIG. 4 is an aberration chart of the optical system according to the second embodiment when focusing at infinity.
Figure 5:
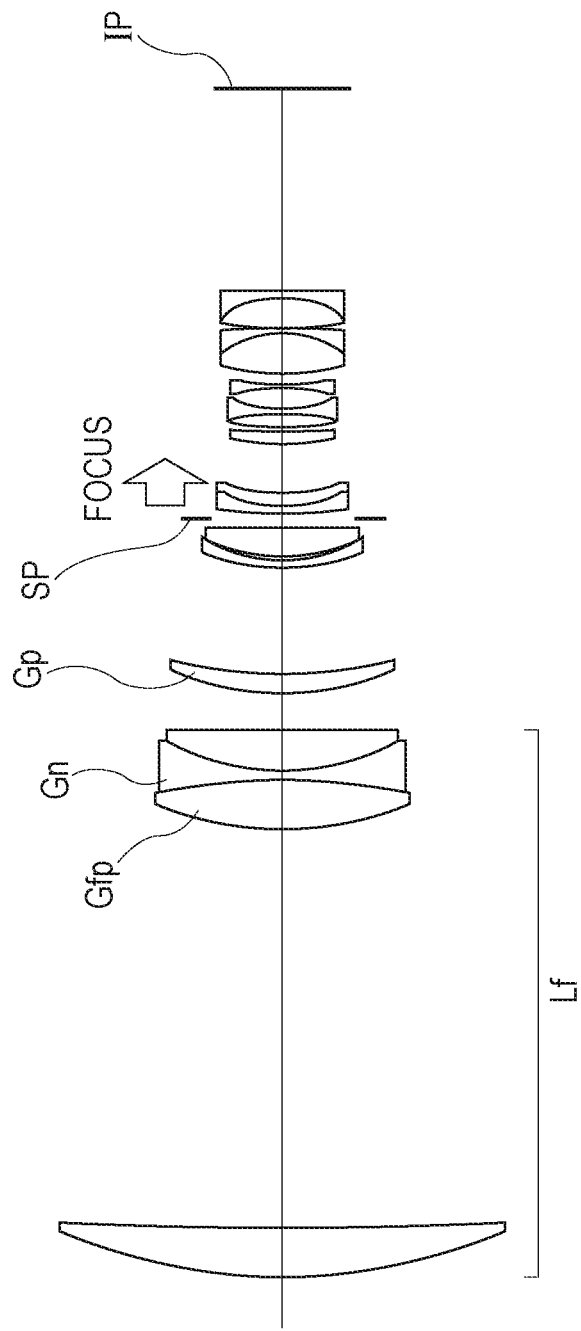
FIG. 5 is a cross-sectional view of lenses of an optical system according to a third embodiment.
Figure 6:
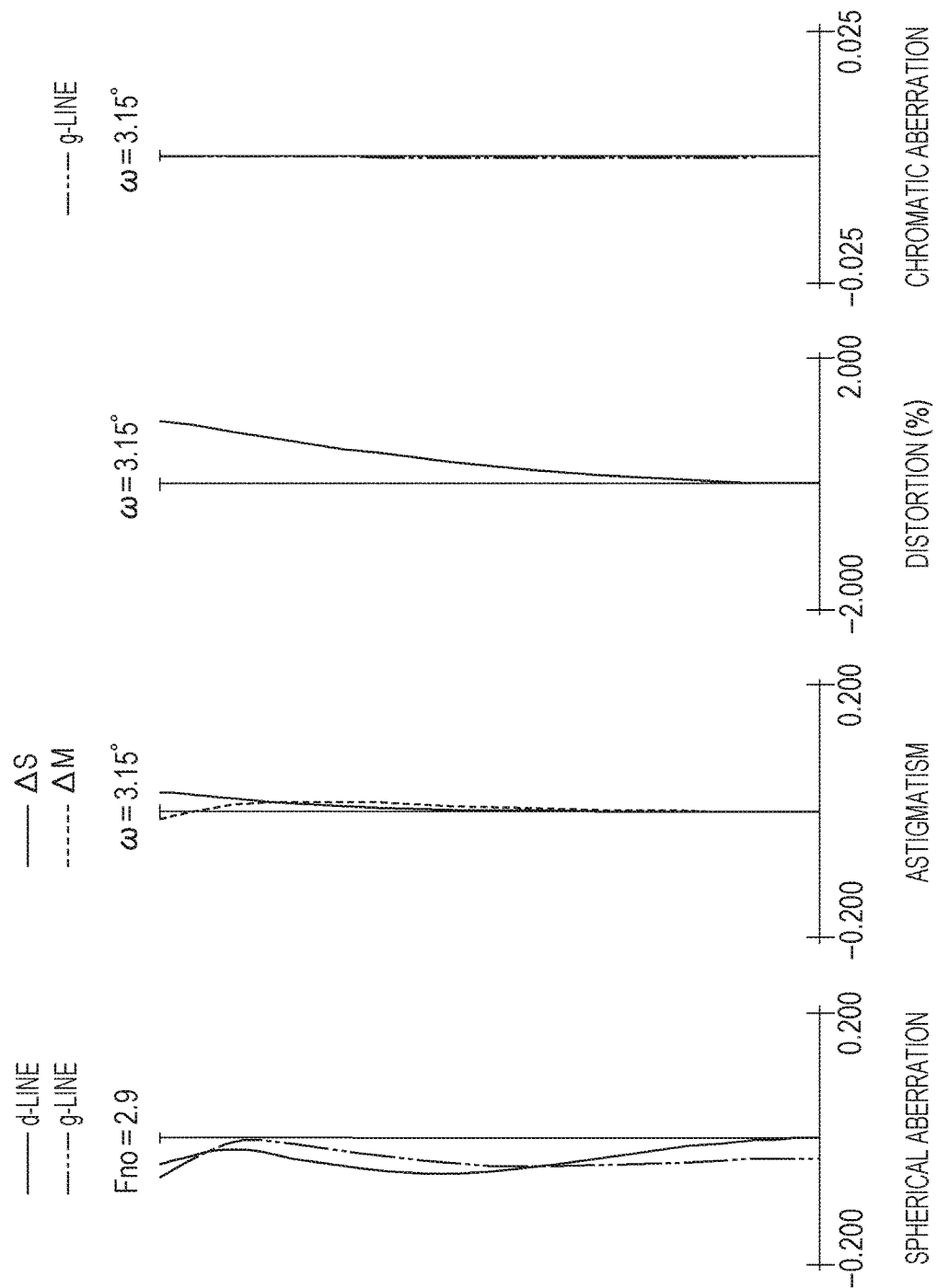
FIG. 6 is an aberration chart of the optical system according to the third embodiment when focusing at infinity.
Figure 7:
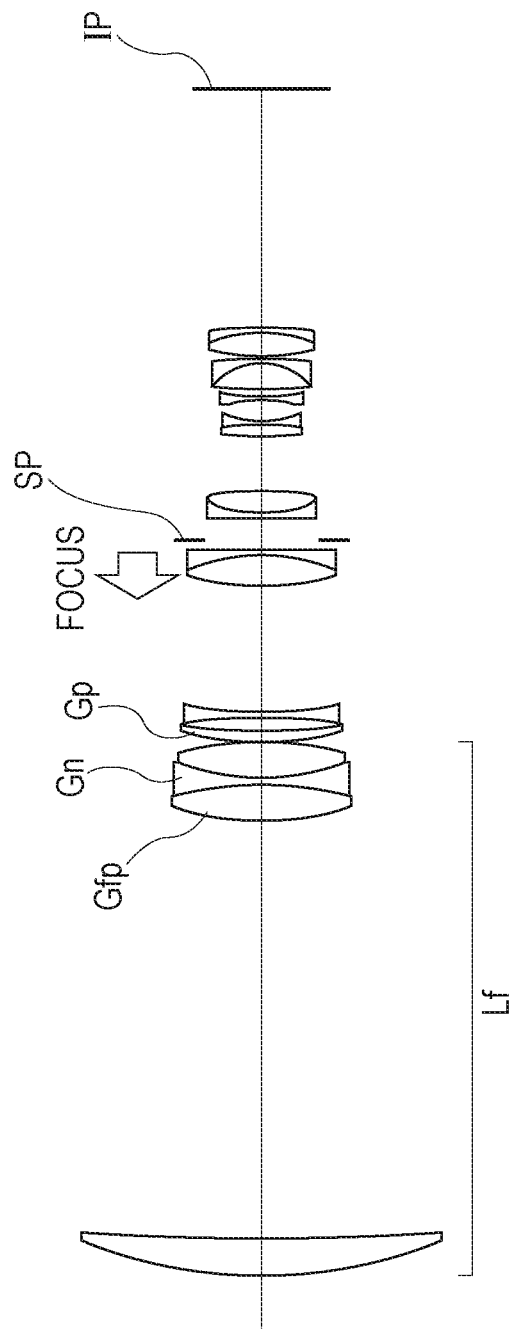
FIG. 7 is a cross-sectional view of lenses of an optical system according to a fourth embodiment.
Figure 8:
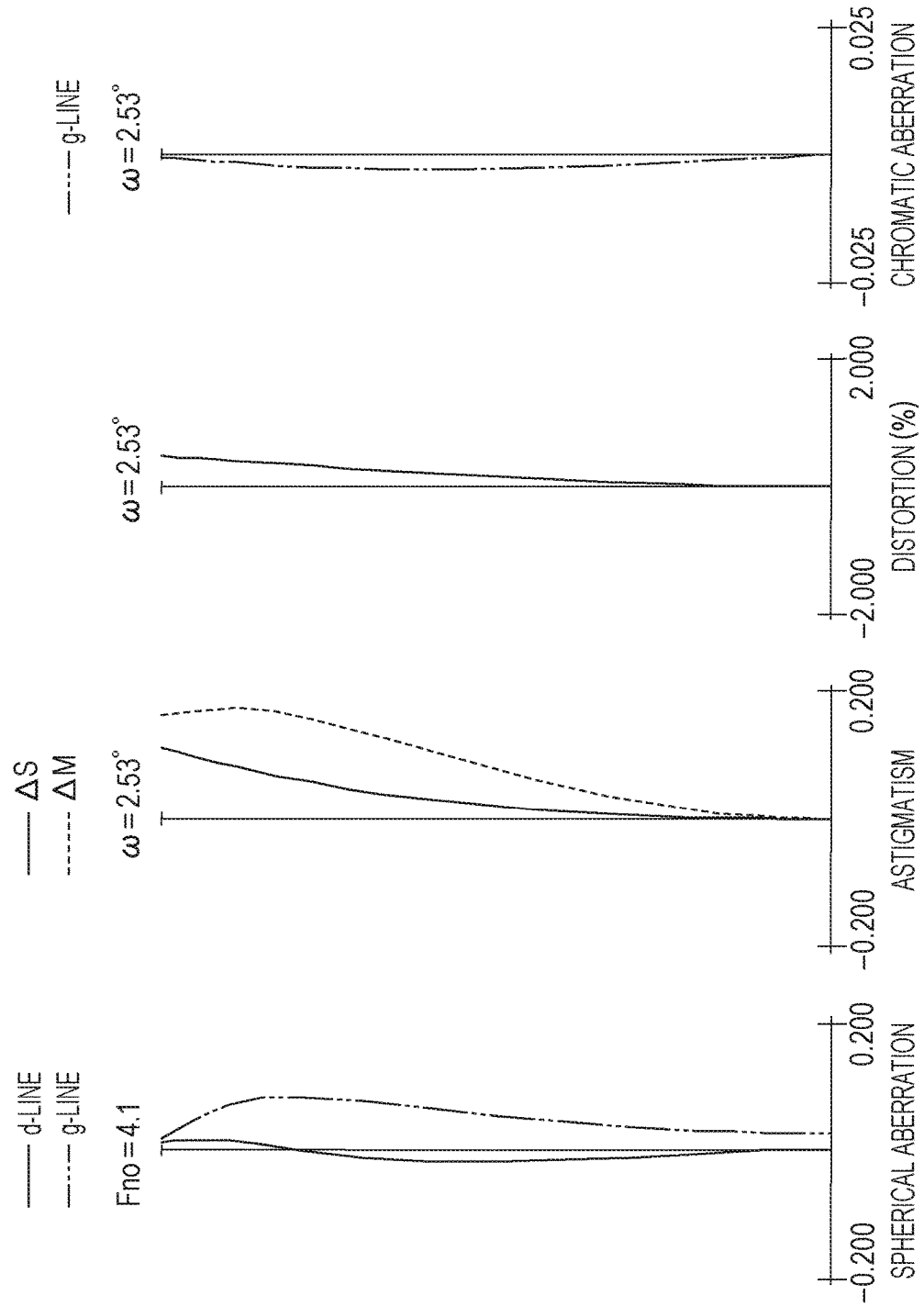
FIG. 8 is an aberration chart of the optical system according to the fourth embodiment when focusing at infinity.
Figure 9:
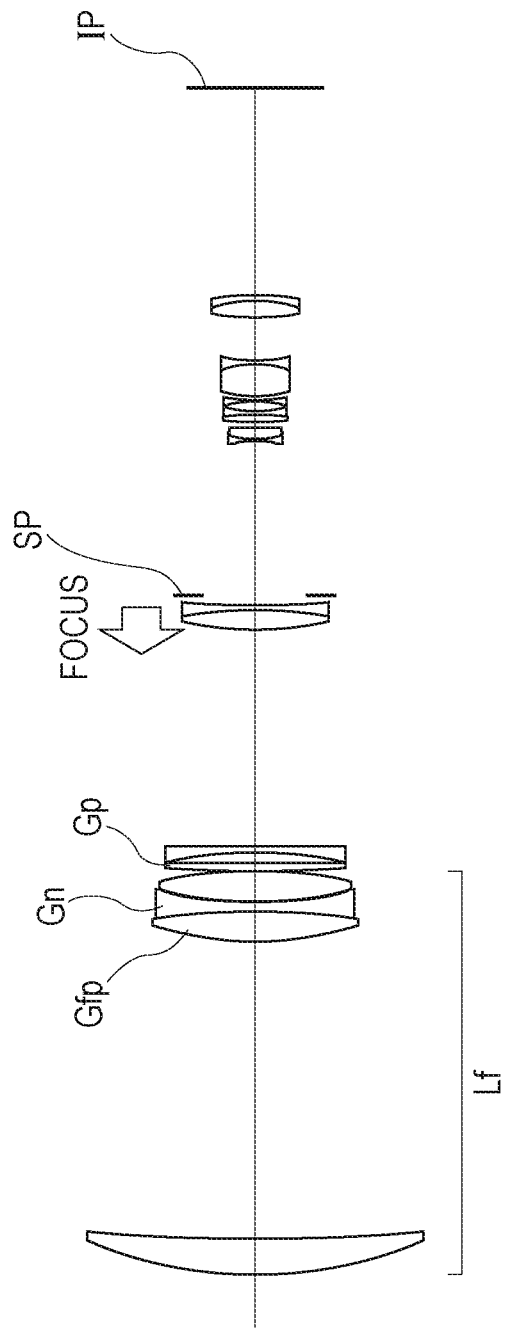
FIG. 9 is a cross-sectional view of lenses of an optical system according to a fifth embodiment.
Figure 10:
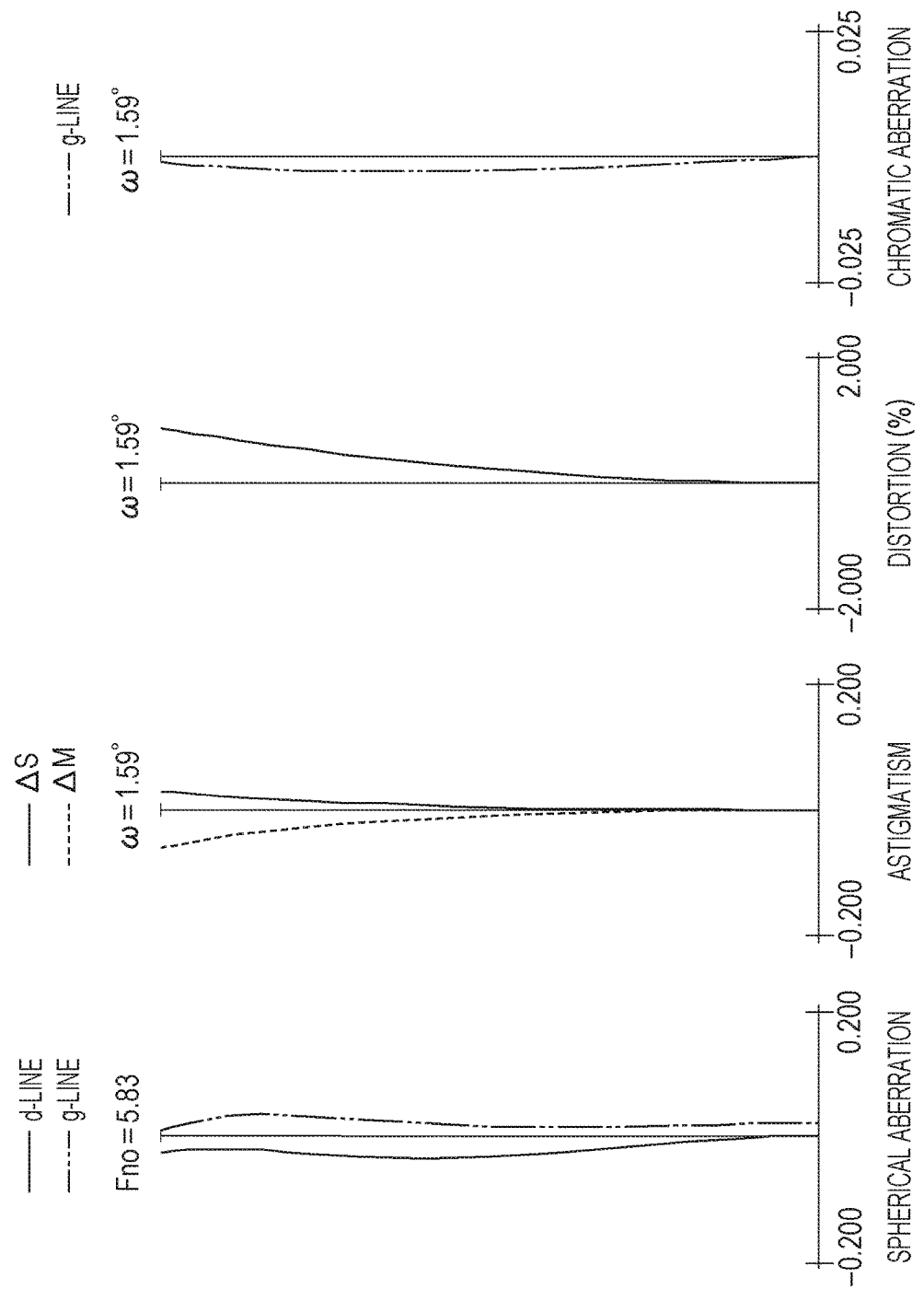
FIG. 10 is an aberration chart of the optical system according to the fifth embodiment when focusing at infinity.

FIG. 1 is a cross-sectional view of lenses of an optical system according to a first embodiment. FIG. 2 is an aberration chart of the optical system according to the first embodiment when focusing at infinity. FIG. 3 is a cross-sectional view of lenses of an optical system according to a second embodiment. FIG. 4 is an aberration chart of the optical system according to the second embodiment when focusing at infinity. FIG. 5 is a cross-sectional view of lenses of an optical system according to a third embodiment. FIG. 6 is an aberration chart of the optical system according to the third embodiment when focusing at infinity. FIG. 7 is a cross-sectional view of lenses of an optical system according to a fourth embodiment. FIG. 8 is an aberration chart of the optical system according to the fourth embodiment when focusing at infinity. FIG. 9 is a cross-sectional view of lenses of an optical system according to a fifth embodiment. FIG. 10 is an aberration chart of the optical system according to the fifth embodiment when focusing at infinity.

Figure 11:
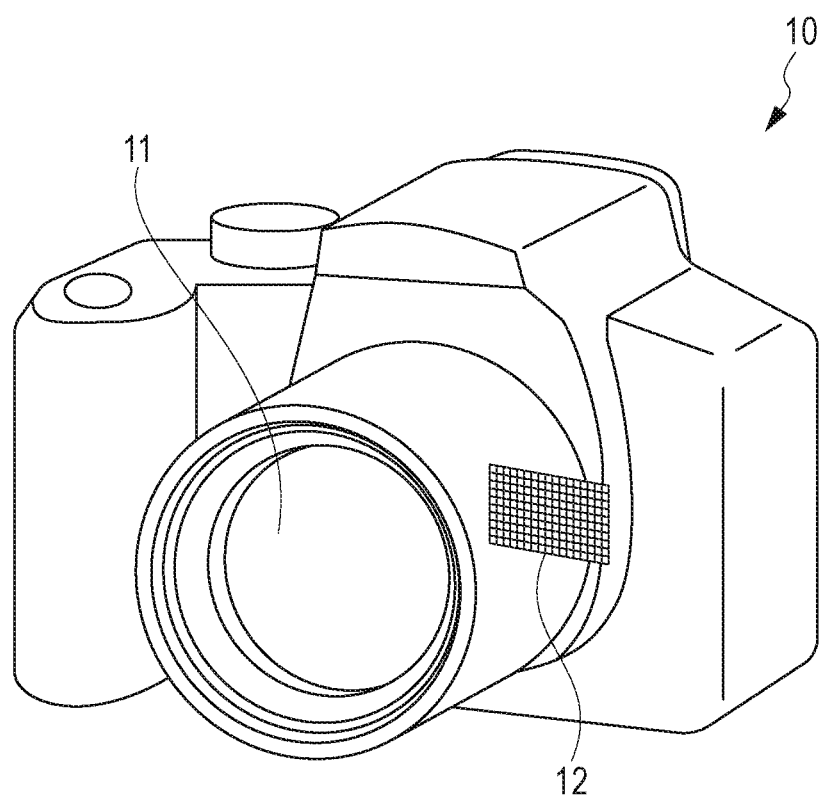
FIG. 11 is a schematic diagram of a main part of an image pickup apparatus of an embodiment.

FIG. 11 is a schematic diagram of a main part of an image pickup apparatus provided with an optical system of the embodiment. The optical system of each embodiment is an image pickup lens system used for an image pickup apparatus, such as a video camera, a digital camera, a silver-halide film camera, and a television camera. In the cross-sectional views of lenses, the left is the object side (i.e., front), and the right is the image side (i.e., rear). In the cross-sectional views of lenses, Lf denotes a front unit.

In each embodiment, SP denotes an aperture diaphragm, and IP denotes an image surface. When the optical system is used as an image pickup optical system of a video camera or a digital camera, an image surface IP corresponds to a solid-state image pickup element (a photoelectric conversion device), such as a CCD sensor or a CMOS sensor. When the optical system of the embodiment is used as an image pickup optical system of a silver-halide film camera, the image surface IP corresponds to a film surface.

In a spherical aberration diagram, Fno denotes an F number, and represents a spherical aberration against a d-line (wavelength: 587.6 nm) and a g-line (wavelength: 435.8 nm). In an astigmatism diagram, $\Delta S$ denotes an astigmatism amount on a sagittal image surface, and $\Delta M$ denotes an astigmatism amount on a meridional image surface. A distortion aberration is shown about a d-line. In the chromatic aberration diagram, a chromatic aberration in a g-line is shown. ω denotes an image pickup half field angle.

In the optical system of each embodiment, a focus unit which moves upon focusing is disposed closer to an image than the positive lens Gp. In optical systems of a first to a third embodiments, a focus unit having negative refractive power is disposed closer to an image than an aperture diaphragm SP, and the focus unit moves toward the image upon focusing from the infinity to a short distance. In the optical system of the first embodiment, the focus unit is constituted by a single negative lens. In optical systems of the second and the third embodiments, the focus unit is constituted by a cemented lens in which a negative lens and a positive lens are bonded together.

In optical systems of a fourth and a fifth embodiments, a focus unit having positive refractive power is disposed closer to an object than an aperture diaphragm SP, and the focus unit moves toward the object upon focusing from the infinity to a short distance. In the optical systems of the fourth and fifth embodiments, the focus unit is constituted by a cemented lens in which a positive lens and a negative lens are bonded together.

In the optical system of each embodiment, some of the lenses in the optical system may function as an image stabilizing unit, and a focus position may be changed by moving the image stabilizing unit in a direction having a component orthogonal to the optical axis. Image blurring correction is thus performed.

Next, a method for reducing a chromatic aberration in the optical system of the embodiment is described. As parameters related to correction of a chromatic aberration in the optical system, an Abbe number νd and a partial dispersion ratio θgF are known. When refractive indices of a material against a g-line (wavelength: 435.8 nm), an F-line (wavelength: 486.1 nm), a C-line (wavelength: 656.3 nm), and a d-line (wavelength: 587.6 nm) are denoted by Ng, NF, NC, and Nd, respectively, the Abbe number νd is defined as νd=(Nd−1)/(NF−NC), and the partial dispersion ratio θF is defined as θgF=(Ng−NF)/(NF−NC).

Next, anomalous dispersion of materials used for the lenses is described.

$$\text{If } \Delta\theta gF = \theta gF - (0.6438 - 0.001682 \times vd) \tag{A}$$

the numerical value of Expression (A) becomes near zero in most of the materials. The larger the absolute value of the numerical value of Expression (A), the higher anomalous dispersion the material has. A secondary spectrum of a chromatic aberration (a chromatic aberration based on a g-line) can be desirably corrected by employing a material of which numerical value of Expression (A) is small as a material for a negative lens disposed in a lens unit having positive refractive power as a whole. A secondary spectrum of a chromatic aberration can be desirably corrected by employing a material of which numerical value of Expression (A) is large as a material for a positive lens disposed in the lens unit having positive refractive power as a whole.

Generally, a correction effect of a primary chromatic aberration is produced by employing a material of high dispersion as a material for a negative lens disposed in a lens unit having positive refractive power as a whole. A primary chromatic aberration tends to occur in a positive lens disposed in a lens unit having positive refractive power as a whole, but an occurrence amount of the primary chromatic aberration can be reduced by employing a material of low dispersion as a material for the positive lens. A primary chromatic aberration can be reduced in the entire optical system by appropriately setting a balance between an occurrence amount and a correction amount of the primary chromatic aberration in the optical system having positive refractive power as a whole.

In the embodiment, the positive lens Gp made from a material of high dispersion and high anomalous dispersion is disposed at a position relatively farther from a lens disposed closest to the object, and the focus unit is disposed closer to the image than the positive lens Gp. In the optical system of the embodiment, an occurrence amount and a correction amount of the primary chromatic aberration are balanced by disposing the positive lens Gp at a position relatively farther from the lens disposed closest to the object. Therefore, the positive lens included in the front unit Lf can be disposed relatively closer to the image, and an effective diameter of the positive lens included in the front unit Lf can be reduced. As a result, a weight of the entire optical system can be reduced.

Fluctuation of the spherical aberration upon focusing can be reduced by disposing the focus unit closer to the image than the positive lens Gp. Since a material of high dispersion and high anomalous dispersion generally has a high refractive index, a spherical aberration tends to occur if the focus unit is constituted by a positive lens Gp made from a material of high dispersion and high anomalous dispersion. Therefore, in order to use a positive lens Gp as the focus unit, it is necessary to reduce a spherical aberration occurring in the focus unit by disposing a negative lens in the focus unit. In the embodiment, both the reduction in weight of the optical system and the desirable correction of the chromatic aberration and the spherical aberration are realized by disposing the positive lens Gp made from a material of high dispersion and high anomalous dispersion aside from the focus unit.

The optical system of each embodiment satisfies the following conditional expressions (1) to (4).

$$LD/f<1.00 \quad (1)$$

$$15.0<vdGp<24.0 \quad (2)$$

$$0.020<\theta gF\_Gp-0.6438+0.001682\times vdGp<0.100 \quad (3)$$

$$0.35<Dpi/LD<0.80 \quad (4)$$

Here, an Abbe number of a material for the positive lens Gp is defined as vdGp, a partial dispersion ratio of that material is defined as θgF_Gp, a distance on an optical axis from an object-side lens surface of the positive lens Gp to the image surface IP is defined as Dpi. A focal length of the entire system is defined as f, and a distance on an optical axis from an object-side lens surface of a lens disposed closest to an object to the image surface IP (hereinafter, referred to as a "total lens length") is defined as LD.

The conditional expression (1) shows that the total lens length LD is shorter than the focal length f of the entire system of the optical system. Generally, in the optical system mounted on a telephoto lens in which the total lens length is shortened, the focal length is longer than the total lens length LD. If the total lens length LD increases to exceed an upper limit of the conditional expression (1), the optical system undesirably increases in size in an optical axis direction.

The conditional expression (2) defines an Abbe number vdGp of a material for the positive lens Gp. If a lower limit of the conditional expression (2) is exceeded, a primary chromatic aberration excessively occurs in the positive lens Gp, which is undesirable. If an upper limit of the conditional expression (2) is exceeded, a chromatic aberration occurring in the positive lens Gp becomes insufficient, and an occurrence amount and a correction amount of the primary chromatic aberration become unbalanced. It is therefore necessary to dispose the positive lens included in the front unit Lf further closer to the object, and the optical system undesirably increases in weight.

The conditional expression (3) defines anomalous dispersion ΔθgF_Gp of a material for the positive lens Gp. A correction effect of a secondary spectrum can be produced by making the positive lens Gp from a material of high anomalous dispersion. If a material exceeding an upper limit of the conditional expression (3) is used as a material for the positive lens Gp, the secondary spectrum is excessively corrected, which is undesirable. If a material exceeding a lower limit of the conditional expression (3) is used as a material of the positive lens Gp, it becomes difficult to desirably correct the secondary spectrum, and it becomes difficult to reduce the secondary spectrum as an entire optical system, which is undesirable.

The conditional expression (4) defines a ratio between the total lens length LD and a distance Dpi on an optical axis from the object-side lens surface of the positive lens Gp to the image surface. If the distance Dpi becomes shorter exceeding a lower limit of the conditional expression (4), a height of an axial ray which enters at the positive lens Gp becomes low, and it becomes difficult to cause a sufficient primary axial chromatic aberration in the positive lens Gp, which is undesirable. If the distance Dpi becomes longer exceeding an upper limit of the conditional expression (4), the height of the axial ray which enters at the positive lens Gp becomes high and the primary axial chromatic aberration excessively occurs in the positive lens Gp, which is undesirable.

In each embodiment, as described above, each element is set appropriately to satisfy the conditional expressions (1) to (4). Therefore, an optical system which is lightweight and of which various aberrations, such as a chromatic aberration, are desirably corrected can be obtained.

In each embodiment, numerical value ranges of the conditional expressions (1) to (4) are desirably defined as follows.

$$LD/f<0.98 \quad (1a)$$

$$18.0<vdGp<23.5 \quad (2a)$$

$$0.022<\theta gF\_Gp-0.6438+0.001682\times vdGp<0.080 \quad (3a)$$

$$0.40<Dpi/LD<0.75 \quad (4a)$$

The numerical value ranges of the conditional expressions (1) to (4) are more desirably defined as follows.

$$LD/f<0.96 \quad (1b)$$

$$20.0<vdGp<23.0 \quad (2b)$$

$$0.025<\theta gF\_Gp-0.6438+0.001682\times vdGp<0.060 \quad (3b)$$

$$0.45<Dpi/LD<0.70 \quad (4b)$$

The positive lens Gp desirably has a meniscus shape of which convex surface is facing the object side. Since the front unit Lf of the positive refractive power is disposed on the object side of the positive lens Gp, convergence light enters at the positive lens Gp. Since the positive lens Gp has a meniscus shape of which convex surface is facing the object side, a light beam can be made to pass through an incident surface and an emission surface of the positive lens Gp in a surface-normal direction. Therefore, occurrence of a spherical aberration and a chromatic aberration can be reduced.

In each embodiment, it is more desirable to satisfy one or more of the following conditional expressions.

$$0.05<(R12-R11)/(R12+R11)<0.90 \quad (5)$$

$$0.30<fp/f<1.50 \quad (6)$$

Here, a curvature radius of the object-side lens surface of the positive lens Gp is defined as R11, a curvature radius of an image-side lens surface of the positive lens Gp is defined as R12, a focal length of the positive lens Gp is defined as fp, and a focal length of the entire system is defined as f.

The conditional expression (5) defines the shape of the positive lens Gp. If a lower limit of conditional expression (5) is exceeded, a difference in curvature radius between the object-side lens surface and the image-side lens surface of the positive lens Gp becomes excessively small, and positive refractive power of the positive lens Gp becomes excessively low. As a result, the lenses disposed closer to the image than the positive lens Gp have large effective diameters and the entire optical system increases in weight, which is undesirable. If an upper limit of the conditional expression (5) is exceeded, a difference in curvature radius between the object-side lens surface and the image-side lens surface of the positive lens Gp becomes excessively large, and a spherical aberration and a axial chromatic aberration excessively occur, which is undesirable.

The conditional expression (6) defines a ratio between the focal length fp of the positive lens Gp and the focal length f of the entire system. If the focal length fp of the positive lens Gp becomes shorter exceeding a lower limit of the conditional expression (6), the refractive power of the positive lens Gp becomes excessively high. As a result, a spherical aberration and an axial chromatic aberration excessively occur in the positive lens Gp, which is undesirable. If the focal length fp of the positive lens Gp becomes longer exceeding an upper limit of the conditional expression (6), the refractive power of the positive lens Gp becomes excessively low. As a result, the lenses disposed closer to the image than the positive lens Gp have large effective diameters and the entire optical system increases in weight, which is undesirable.

If an Abbe number of a material for the negative lens Gn included in the front unit Lf is defined as vdGn, a distance on an optical axis between the negative lens Gn and the positive lens Gp is defined as Dnp, a focal length of the negative lens Gn is defined as fn, a focal length of the entire system is defined as f, and a focal length of the positive lens Gp is defined as fp, it is desirable to satisfy one or more of the following conditional expressions.

$$20.0 < vdGn < 45.0 \quad (7)$$

$$0.015 < Dnp/LD < 0.20 \quad (8)$$

$$0.05 < -fn/f < 0.30 \quad (9)$$

$$0.10 < -fn/fp < 0.60 \quad (10)$$

The conditional expression (7) defines the Abbe number vdGn of a material for the negative lens Gn included in the front unit Lf. If a lower limit of the conditional expression (7) is exceeded, a chromatic aberration is excessively corrected in the negative lens Gn, which is undesirable. If an upper limit of the conditional expression (7) is exceeded, it becomes difficult to sufficiently correct a chromatic aberration in the negative lens Gn, which is undesirable.

The negative lens Gn desirably has a biconcave shape and is desirably a negative lens disposed closest to the object among negative lenses included in the optical system. Since the negative lens Gn has a biconcave shape, negative refractive power can be increased, whereby a primary chromatic aberration in the negative lens Gn can be desirably corrected. A correction effect of a chromatic aberration in the negative lens Gn can be enhanced by disposing the negative lens Gn relatively closer to the object.

The conditional expression (8) defines a ratio between the distance Dnp on an optical axis between the negative lens Gn and the positive lens Gp and the total lens length LD. If the distance Dnp becomes shorter exceeding a lower limit of the conditional expression (8), a height of an axial ray which enters at the negative lens Gn becomes low, and it becomes difficult to sufficiently correct a chromatic aberration in the negative lens Gn, which is undesirable. If the distance Dnp becomes longer exceeding an upper limit of the conditional expression (8), the negative lens Gn increases in effective diameter and increases in weight, which is undesirable.

The conditional expression (9) defines a ratio between the focal length fn of the negative lens Gn and the focal length f of the entire system. If the focal length fn of the negative lens Gn becomes shorter exceeding a lower limit of the conditional expression (9), the refractive power of the negative lens Gn becomes excessively high. As a result, a spherical aberration and an axial chromatic aberration excessively occur in the negative lens Gn, which is undesirable. If the focal length fn of the negative lens Gn becomes longer exceeding an upper limit of the conditional expression (9), the refractive power of the negative lens Gn becomes excessively low. As a result, it becomes difficult to sufficiently cancel a spherical aberration and a chromatic aberration occurring in the positive lens Gp, which is undesirable.

The conditional expression (10) defines a ratio between the focal length fn of the negative lens Gn and the focal length fp of the positive lens Gp. If the focal length fn of the negative lens Gn becomes shorter exceeding a lower limit of the conditional expression (10), the refractive power of the negative lens Gn becomes excessively high. As a result, a spherical aberration and an axial chromatic aberration excessively occur in the negative lens Gn, which is undesirable. If the focal length fn of the negative lens Gn becomes longer exceeding an upper limit of the conditional expression (10), the refractive power of the negative lens Gn becomes excessively low. As a result, it becomes difficult to sufficiently cancel a spherical aberration and a chromatic aberration occurring in the positive lens Gp, which is undesirable.

An Abbe number of a material for the positive lens included in the front unit Lf is defined as vdGfp, and a partial dispersion ratio of that material is defined as $\theta gF\_Gfp$. It is desirable that a positive lens Gfp which satisfies conditional expressions of $$73.0 < vdGfp \quad (11)$$

$$0.030 < \theta gF\_Gfp - 0.6438 + 0.001682 \times vdGfp < 0.100 \quad (12)$$

is included in the front unit Lf. As illustrated in FIGS. 1, 3, 5, 7, and 9 the positive lens Gfp may be disposed second closest to the object side of the front unit among the positive lenses included in the front unit.

The conditional expression (11) defines the Abbe number vdGfp of a material of the positive lens Gfp included in the front unit Lf. If a lower limit of the conditional expression (11) is exceeded, a chromatic aberration excessively occurs in the positive lens Gfp, which is undesirable.

The conditional expression (12) defines anomalous dispersion $\Delta\theta gF\_Gfp$ of a material of the positive lens Gfp included in the front unit Lf. A correction effect of a secondary spectrum can be produced by making the positive lens Gfp from a material of high anomalous dispersion. If a material of which anomalous dispersion $\Delta\theta gF\_Gfp$ exceeds a lower limit of the conditional expression (12) is used, it becomes difficult to desirably correct a secondary spectrum and, therefore, it becomes difficult to reduce a secondary spectrum in the entire optical system, which is undesirable. If a material of which anomalous dispersion $\Delta\theta gF\_Gfp$ exceeds an upper limit of the conditional expression (12) is used, a secondary spectrum is excessively corrected and it becomes difficult to reduce a secondary spectrum in the entire optical system, which is undesirable.

If a distance on an optical axis between the positive lens Gfp and the positive lens Gp is defined as Dpp, a focal length of the positive lens Gfp is defined as ffp, a focal length of the entire system is defined as f, and a focal length of the positive lens Gp is defined as fp, it is desirable to satisfy one or more of the following conditional expressions.

$$0.01 < Dpp/LD < 0.20 \quad (13)$$

$$0.15 < ffp/f < 0.60 \quad (14)$$

$$0.20 < ffp/fp < 1.50 \quad (15)$$

The conditional expression (13) defines a ratio between the distance Dpp on an optical axis between the positive lens Gfp included in the front unit Lf and the positive lens Gp and the total lens length LD. If the distance Dpp becomes shorter exceeding a lower limit of the conditional expression (13), the positive lens Gp increases in effective diameter and increases in weight, which is undesirable. If the distance Dpp becomes longer exceeding an upper limit of the conditional expression (13), a height of an axial ray which enters at the positive lens Gp becomes low, and it becomes difficult to cause a sufficient primary chromatic aberration in the positive lens Gfp. As a result, it becomes difficult to reduce a primary chromatic aberration in the entire optical system, which is undesirable.

The conditional expression (14) defines a ratio between the focal length ffp of the positive lens Gfp and the focal length f of the entire system. If the focal length ffp of the positive lens Gfp becomes shorter exceeding a lower limit of the conditional expression (14), the refractive power of the positive lens Gfp becomes excessively high. As a result, a spherical aberration and an axial chromatic aberration excessively occur in the positive lens Gfp, which is undesirable. If the focal length ffp of the positive lens Gfp becomes longer exceeding an upper limit of the conditional expression (14), the refractive power of the positive lens Gfp becomes excessively low. As a result, it becomes difficult to sufficiently cause a primary chromatic aberration, and it becomes difficult to reduce a primary chromatic aberration in the entire optical system, which is undesirable.

The conditional expression (15) defines a ratio between the focal length ffp of the positive lens Gfp and the focal length fp of the positive lens Gp. If the focal length ffp of the positive lens Gfp becomes shorter exceeding a lower limit of the conditional expression (15), the refractive power of the positive lens Gfp becomes excessively high. As a result, a spherical aberration and an axial chromatic aberration excessively occur in the positive lens Gfp, which is undesirable. If the focal length ffp of the positive lens Gfp becomes longer exceeding an upper limit of the conditional expression (15), the refractive power of the positive lens Gfp becomes excessively low. As a result, an occurrence amount of a primary chromatic aberration is reduced and it becomes difficult to reduce a primary chromatic aberration in the entire optical system, which is undesirable.

The numerical value ranges of the conditional expressions (5) to (15) are desirably defined as follows.

$0.07<(R12-R11)/(R12+R11)<0.85$ (5a)

$0.35<fp/f<1.30$ (6a)

$22.0<vdGn<36.0$ (7a)

$0.020<Dnp/LD<0.16$ (8a)

$0.08<-fn/f<0.25$ (9a)

$0.12<-fn/fp<0.55$ (10a)

$75.0<vdGfp$ (11a)

$0.040<\theta gF\_Gfp-0.6438+0.001682\times vdGfp<0.080$ (12a)

$0.02<Dpp/LD<0.17$ (13a)

$0.20<ffp/f<0.55$ (14a)

$0.25<ffp/fp<1.30$ (15a)

The numerical value ranges of the conditional expressions (5) to (15) are more desirably defined as follows.

$0.08<(R12-R11)/(R12+R11)<0.80$ (5b)

$0.40<fp/f<1.10$ (6b)

$24.0<vdGn<28.0$ (7b)

$0.025<Dnp/LD<0.14$ (8b)

$0.10<-fn/f<0.21$ (9b)

$0.13<-fn/fp<0.52$ (10b)

$83.0<vdGfp$ (11b)

$0.050<\theta gF\_Gfp-0.6438+0.001682\times vdGfp<0.070$ (12b)

$0.03<Dpp/LD<0.15$ (13b)

$0.25<ffp/f<0.50$ (14b)

$0.28<ffp/fp<1.20$ (15b)

Next, numerical embodiments 1 to 5 respectively corresponding to the first to the fifth embodiments are shown. In each numerical embodiment, i denotes an order of the optical surfaces from the object side. ri denotes a curvature radius of an i-th optical surface (an i-th surface), di denotes a distance between the i-th surface and the (i+1)th surface, ndi denotes a refractive index of a material of the i-th optical member against a d-line, and vdi denotes the Abbe number of that material.

In each embodiment, back focus (BF) denotes a distance from a surface closest to the image to the image surface in the optical system expressed by an air conversion length. Correspondence between the conditional expressions described above and each numerical embodiment is shown in Table. In Table, $\Delta\theta gF\_Gi$ denotes a numerical value of $\theta gF\_Gi-(0.6438-0.001682\times vdi)$.

A protective glass for protecting lenses may be disposed on an object side of the front unit Lf in each embodiment. A protective glass of significantly low refractive power may not be included in the front unit Lf.

Numerical Embodiment 1

| unit mm | | | | | |
|---|---|---|---|---|---|
| surface data | | | | | |
| surface number | r | d | nd | vd | effective diameter |
| 1 | 150.642 | 16.15 | 1.59270 | 35.3 | 135.36 |
| 2 | 730.042 | 100.00 | | | 134.20 |
| 3 | 107.703 | 14.79 | 1.43387 | 95.1 | 84.27 |
| 4 | −328.442 | 0.27 | | | 82.15 |
| 5 | −318.403 | 3.00 | 1.85478 | 24.8 | 81.94 |
| 6 | 87.265 | 3.08 | | | 76.51 |
| 7 | 88.737 | 12.63 | 1.43387 | 95.1 | 76.87 |
| 8 | −1026.629 | 35.00 | | | 76.22 |
| 9 | 68.568 | 6.10 | 1.89286 | 20.4 | 62.07 |
| 10 | 127.179 | 5.00 | | | 60.58 |
| 11 | 68.368 | 2.30 | 1.65412 | 39.7 | 55.04 |
| 12 | 43.418 | 1.15 | | | 51.09 |
| 13 | 48.830 | 7.97 | 1.43387 | 95.1 | 51.07 |
| 14 | 133.424 | 7.57 | | | 49.03 |
| 15(diaphragm) | ∞ | 5.89 | | | 44.73 |
| 16 | −3151.717 | 1.87 | 1.91082 | 35.3 | 40.00 |
| 17 | 61.271 | 30.34 | | | 38.04 |
| 18 | 97.234 | 1.76 | 1.92286 | 20.9 | 33.23 |
| 19 | 63.011 | 9.17 | 1.56732 | 42.8 | 32.60 |
| 20 | −96.758 | 1.07 | | | 33.13 |
| 21 | 110.488 | 4.14 | 1.85025 | 30.1 | 32.94 |
| 22 | −106.157 | 1.44 | 1.59522 | 67.7 | 32.67 |
| 23 | 36.770 | 5.26 | | | 31.17 |
| 24 | −77.293 | 1.47 | 1.72916 | 54.7 | 31.20 |
| 25 | 75.820 | 4.11 | | | 32.49 |
| 26 | 89.505 | 10.00 | 1.64769 | 33.8 | 36.21 |
| 27 | −216.973 | 0.15 | | | 38.52 |

-continued unit mm

| 28 | 77.954 | 12.44 | 1.73800 | 32.3 | 39.99 |
| 29 | −58.563 | 2.00 | 1.80809 | 22.8 | 39.98 |
| 30 | ∞ | 3.00 | | | 40.13 |
| 31 | ∞ | 2.20 | 1.51633 | 64.1 | 42.00 |
| 32 | ∞ | 60.70 | | | 42.00 |
| image surface | ∞ | | | | |

| focal length | 392.55 |
| F number | 2.90 |
| half field angle | 3.15 |
| image height | 21.64 |
| total lens length | 372.00 |
| BF | 60.70 |
| entrance pupil position | 532.27 |
| exit pupil position | −109.30 |
| front principal point position | 18.38 |
| rear principal point position | −331.85 | single lens data

| lens | starting surface | focal length |
|---|---|---|
| 1 | 1 | 316.96 |
| 2 | 3 | 188.88 |
| 3 | 5 | −79.86 |
| 4 | 7 | 188.90 |
| 5 | 9 | 158.84 |
| 6 | 11 | −188.77 |
| 7 | 13 | 172.59 |
| 8 | 16 | −65.97 |
| 9 | 18 | −198.89 |
| 10 | 19 | 68.69 |
| 11 | 21 | 64.24 |
| 12 | 22 | −45.71 |
| 13 | 24 | −52.28 |
| 14 | 26 | 99.10 |
| 15 | 28 | 47.14 |
| 16 | 29 | −72.47 |

Numerical Embodiment 2 unit mm surface data

| surface number | r | d | nd | vd | effective diameter |
|---|---|---|---|---|---|
| 1 | 99.464 | 14.87 | 1.59270 | 35.3 | 101.04 |
| 2 | 456.909 | 64.58 | | | 99.29 |
| 3 | 80.681 | 11.90 | 1.43387 | 95.1 | 62.00 |
| 4 | −167.967 | 0.15 | | | 60.11 |
| 5 | −166.869 | 2.30 | 1.85478 | 24.8 | 59.92 |
| 6 | 51.072 | 0.15 | | | 54.95 |
| 7 | 50.726 | 11.60 | 1.43387 | 95.1 | 55.04 |
| 8 | −770.506 | 10.68 | | | 54.62 |
| 9 | 59.715 | 3.81 | 1.89286 | 20.4 | 50.66 |
| 10 | 74.063 | 8.36 | | | 49.33 |
| 11 | 58.185 | 2.00 | 1.65412 | 39.7 | 45.60 |
| 12 | 45.596 | 1.04 | | | 43.86 |
| 13 | 51.918 | 6.42 | 1.90366 | 31.3 | 43.79 |
| 14 | 206.154 | 3.00 | | | 42.24 |
| 15(diaphragm) | ∞ | 2.91 | | | 40.40 |
| 16 | 2015.159 | 1.90 | 1.91082 | 35.3 | 37.51 |
| 17 | 32.641 | 3.50 | 1.84666 | 23.8 | 34.33 |
| 18 | 43.038 | 17.66 | | | 33.42 |
| 19 | 64.610 | 5.62 | 1.49700 | 81.5 | 31.81 |
| 20 | −78.046 | 1.00 | | | 31.84 |
| 21 | 469.814 | 3.84 | 1.85478 | 24.8 | 30.43 |
| 22 | −64.210 | 1.50 | 1.60311 | 60.6 | 30.18 |
| 23 | 33.512 | 7.59 | | | 28.87 |
| 24 | −47.827 | 1.50 | 1.60311 | 60.6 | 29.44 |
| 25 | 93.980 | 2.80 | | | 31.60 |
| 26 | 77.014 | 6.40 | 1.59551 | 39.2 | 36.97 |
| 27 | −82.425 | 0.42 | | | 37.69 |

-continued unit mm

| 28 | 108.793 | 10.03 | 1.85478 | 24.8 | 38.99 |
| 29 | −32.591 | 2.00 | 1.89286 | 20 | 38.97 |
| 30 | 1236.437 | 0.19 | | | 39.14 |
| 31 | ∞ | 2.20 | 1.51633 | 64.1 | 40.00 |
| 32 | ∞ | 62.03 | | | 40.00 |
| image surface | ∞ | | | | |

| focal length | 292.46 |
| F number | 2.90 |
| half field angle | 4.23 |
| image height | 21.64 |
| total lens length | 273.98 |
| BF | 62.03 |
| entrance pupil position | 301.22 |
| exit pupil position | −71.11 |
| front principal point position | −48.75 |
| rear principal point position | −230.43 | single lens data

| lens | starting surface | focal length |
|---|---|---|
| 1 | 1 | 211.24 |
| 2 | 3 | 127.46 |
| 3 | 5 | −45.53 |
| 4 | 7 | 110.16 |
| 5 | 9 | 306.80 |
| 6 | 11 | −343.79 |
| 7 | 13 | 75.30 |
| 8 | 16 | −36.44 |
| 9 | 17 | 138.24 |
| 10 | 19 | 72.07 |
| 11 | 21 | 66.31 |
| 12 | 22 | −36.30 |
| 13 | 24 | −52.35 |
| 14 | 26 | 67.87 |
| 15 | 28 | 30.33 |
| 16 | 29 | −35.54 |

Numerical Embodiment 3 unit mm surface data

| surface number | r | d | nd | vd | effective diameter |
|---|---|---|---|---|---|
| 1 | 178.783 | 15.20 | 1.59270 | 35.3 | 135.31 |
| 2 | 1415.744 | 124.89 | | | 134.26 |
| 3 | 108.327 | 15.15 | 1.43387 | 95.1 | 78.98 |
| 4 | −192.136 | 0.15 | | | 76.97 |
| 5 | −197.207 | 3.00 | 1.85478 | 24.8 | 76.67 |
| 6 | 76.176 | 0.15 | | | 71.84 |
| 7 | 73.738 | 12.64 | 1.43387 | 95.1 | 72.03 |
| 8 | 13386.147 | 11.63 | | | 71.67 |
| 9 | 86.704 | 5.89 | 1.89286 | 20.4 | 68.81 |
| 10 | 159.733 | 33.10 | | | 67.66 |
| 11 | 69.154 | 2.30 | 1.65412 | 39.7 | 49.89 |
| 12 | 45.945 | 1.53 | | | 47.30 |
| 13 | 55.402 | 8.24 | 1.66672 | 48.3 | 47.22 |
| 14 | 2426.623 | 3.00 | | | 45.60 |
| 15(diaphragm) | ∞ | 2.00 | | | 42.92 |
| 16 | 174.740 | 2.00 | 1.90366 | 31.3 | 40.00 |
| 17 | 37.347 | 4.13 | 1.49700 | 81.5 | 36.73 |
| 18 | 52.890 | 15.51 | | | 35.68 |
| 19 | 87.342 | 4.14 | 1.84666 | 23.8 | 31.49 |
| 20 | 403.419 | 1.07 | | | 31.05 |
| 21 | 95.943 | 4.24 | 1.85478 | 24.8 | 32.55 |
| 22 | −94.709 | 1.50 | 1.76385 | 48.5 | 32.10 |
| 23 | 38.328 | 6.23 | | | 30.47 |
| 24 | −80.394 | 1.50 | 1.76385 | 48.5 | 30.84 |
| 25 | 109.369 | 3.26 | | | 32.09 |
| 26 | 72.385 | 12.53 | 1.67300 | 38.1 | 34.59 |
| 27 | −32.147 | 1.70 | 1.59522 | 67.7 | 35.84 |

-continued unit mm

| | | | | | |
|---|---|---|---|---|---|
| 28 | −300.120 | 0.15 | | | 37.16 |
| 29 | 144.097 | 9.42 | 1.85478 | 24.8 | 37.64 |
| 30 | −34.206 | 2.00 | 1.89286 | 20.4 | 37.67 |
| 31 | 1892.910 | 0.16 | | | 37.94 |
| 32 | ∞ | 2.20 | 1.51633 | 64.1 | 40.00 |
| 33 | ∞ | 61.34 | | | 40.00 |
| image surface | ∞ | | | | |

| | |
|---|---|
| focal length | 392.56 |
| F number | 2.90 |
| half field angle | 3.15 |
| image height | 21.64 |
| total lens length | 371.98 |
| BF | 61.34 |
| entrance pupil position | 626.88 |
| exit pupil position | −65.09 |
| front principal point position | −199.43 |
| rear principal point position | −331.22 | single lens data

| lens | starting surface | focal length |
|---|---|---|
| 1 | 1 | 343.67 |
| 2 | 3 | 162.13 |
| 3 | 5 | −63.96 |
| 4 | 7 | 170.85 |
| 5 | 9 | 204.61 |
| 6 | 11 | −217.83 |
| 7 | 13 | 84.92 |
| 8 | 16 | −52.93 |
| 9 | 17 | 234.98 |
| 10 | 19 | 130.88 |
| 11 | 21 | 56.34 |
| 12 | 22 | −35.55 |
| 13 | 24 | −60.45 |
| 14 | 26 | 34.75 |
| 15 | 27 | −60.63 |
| 16 | 29 | 33.15 |
| 17 | 30 | −37.61 |

Numerical Embodiment 4 unit mm surface data

| surface number | r | d | nd | vd | effective diameter |
|---|---|---|---|---|---|
| 1 | 163.339 | 13.35 | 1.59270 | 35.3 | 120.06 |
| 2 | 943.811 | 144.80 | | | 118.94 |
| 3 | 104.653 | 12.00 | 1.43387 | 95.1 | 61.40 |
| 4 | −116.617 | 0.15 | | | 59.82 |
| 5 | −117.086 | 2.30 | 1.85478 | 24.8 | 59.62 |
| 6 | 80.844 | 0.15 | | | 57.15 |
| 7 | 77.117 | 12.13 | 1.43387 | 95.1 | 57.26 |
| 8 | −114.243 | 0.15 | | | 57.03 |
| 9 | 95.689 | 3.57 | 1.89286 | 20.4 | 54.37 |
| 10 | 129.498 | 4.81 | | | 53.26 |
| 11 | −174.822 | 2.00 | 1.48749 | 70.2 | 53.26 |
| 12 | 146.631 | 43.95 | | | 51.87 |
| 13 | 107.088 | 10.02 | 1.64769 | 33.8 | 49.80 |
| 14 | −72.534 | 2.20 | 1.58913 | 61.1 | 49.14 |
| 15 | −4440.551 | 2.95 | | | 47.39 |
| 16(diaphragm) | ∞ | 8.01 | | | 40.94 |
| 17 | 702.560 | 1.90 | 1.84666 | 23.8 | 36.97 |
| 18 | 47.597 | 7.46 | 1.61340 | 44.3 | 35.58 |
| 19 | −126.474 | 19.15 | | | 35.02 |
| 20 | 122.013 | 3.76 | 1.84666 | 23.8 | 26.80 |
| 21 | −71.635 | 1.40 | 1.76385 | 48.5 | 26.39 |
| 22 | 34.538 | 6.95 | | | 25.37 |
| 23 | −64.820 | 1.40 | 1.76385 | 48.5 | 26.15 |
| 24 | 90.115 | 2.28 | | | 27.35 |
| 25 | 139.671 | 9.08 | 1.73800 | 32.3 | 29.11 |

-continued unit mm

| | | | | | |
|---|---|---|---|---|---|
| 26 | −21.978 | 1.70 | 1.76385 | 48.5 | 30.01 |
| 27 | −232.122 | 0.96 | | | 32.79 |
| 28 | 78.499 | 8.15 | 1.73800 | 32.3 | 34.89 |
| 29 | −47.550 | 1.90 | 1.89286 | 20.4 | 35.24 |
| 30 | −127.714 | 9.43 | | | 35.96 |
| 31 | ∞ | 2.20 | 1.51633 | 64.1 | 40.00 |
| 32 | ∞ | 71.62 | | | 40.00 |
| image surface | ∞ | | | | |

| | |
|---|---|
| focal length | 488.82 |
| F number | 4.10 |
| half field angle | 2.53 |
| image height | 21.64 |
| total lens length | 411.90 |
| BF | 71.62 |
| entrance pupil position | 760.74 |
| exit pupil position | −81.18 |
| front principal point position | −314.21 |
| rear principal point position | −417.20 | single lens data

| lens | starting surface | focal length |
|---|---|---|
| 1 | 1 | 331.15 |
| 2 | 3 | 129.25 |
| 3 | 5 | −55.65 |
| 4 | 7 | 108.19 |
| 5 | 9 | 391.00 |
| 6 | 11 | −163.25 |
| 7 | 13 | 68.26 |
| 8 | 14 | −125.19 |
| 9 | 17 | −60.38 |
| 10 | 18 | 57.31 |
| 11 | 20 | 53.79 |
| 12 | 21 | −30.33 |
| 13 | 23 | −49.16 |
| 14 | 25 | 26.36 |
| 15 | 26 | −31.89 |
| 16 | 28 | 41.26 |
| 17 | 29 | −85.80 |

Numerical Embodiment 5 unit mm surface data

| surface number | r | d | nd | vd | effective diameter |
|---|---|---|---|---|---|
| 1 | 168.552 | 14.91 | 1.59270 | 35.3 | 133.65 |
| 2 | 853.592 | 122.18 | | | 132.49 |
| 3 | 148.612 | 11.95 | 1.43387 | 95.1 | 81.00 |
| 4 | −254.303 | 0.15 | | | 79.55 |
| 5 | −257.480 | 3.20 | 1.85478 | 24.8 | 79.38 |
| 6 | 141.530 | 0.15 | | | 76.27 |
| 7 | 127.364 | 12.78 | 1.43387 | 95.1 | 76.25 |
| 8 | −174.232 | 0.15 | | | 75.68 |
| 9 | 577.170 | 3.41 | 1.89286 | 20.4 | 72.87 |
| 10 | 4707.875 | 3.60 | | | 72.09 |
| 11 | −190.967 | 3.00 | 1.80400 | 46.6 | 72.07 |
| 12 | 1388.400 | 88.70 | | | 71.03 |
| 13 | 145.654 | 7.22 | 1.59551 | 39.2 | 58.51 |
| 14 | −226.906 | 2.80 | 1.67790 | 55.3 | 57.84 |
| 15 | 984.208 | 3.28 | | | 56.57 |
| 16 (diaphragm) | ∞ | 63.32 | | | 45.47 |
| 17 | −414.599 | 1.20 | 1.76385 | 48.5 | 20.91 |
| 18 | 29.784 | 4.80 | 1.54814 | 45.8 | 20.45 |
| 19 | −119.234 | 2.00 | | | 20.87 |
| 20 | 99.170 | 3.22 | 1.78472 | 25.7 | 25.23 |
| 21 | −62.702 | 1.30 | 1.76385 | 48.5 | 25.08 |
| 22 | 48.094 | 3.54 | | | 24.53 |
| 23 | −80.964 | 1.30 | 1.76385 | 48.5 | 24.69 |
| 24 | 140.808 | 1.27 | | | 25.34 |

-continued unit mm

| | | | | | |
|---|---|---|---|---|---|
| 25 | 57.182 | 13.30 | 1.67300 | 38.1 | 24.00 |
| 26 | −35.514 | 1.30 | 1.59522 | 67.7 | 25.49 |
| 27 | 74.378 | 17.60 | | | 26.08 |
| 28 | 112.883 | 7.02 | 1.65412 | 39.7 | 33.62 |
| 29 | −43.326 | 1.70 | 1.89286 | 20.4 | 33.92 |
| 30 | −99.977 | 11.95 | | | 34.71 |
| 31 | ∞ | 2.20 | 1.51633 | 64.1 | 40.00 |
| 32 | ∞ | 71.54 | | | 40.00 |
| Image surface | ∞ | | | | |

-continued unit mm

| | | |
|---|---|---|
| 6 | 11 | −208.62 |
| 7 | 13 | 150.05 |
| 8 | 14 | −271.75 |
| 9 | 17 | −36.34 |
| 10 | 18 | 43.98 |
| 11 | 20 | 49.38 |
| 12 | 21 | −35.45 |
| 13 | 23 | −67.13 |
| 14 | 25 | 34.55 |
| 15 | 26 | −40.21 |
| 16 | 28 | 48.73 |
| 17 | 29 | −86.87 |

TABLE

| | | First Embodiment | Second Embodiment | Third Embodiment | Fourth Embodiment | Fifth Embodiment |
|---|---|---|---|---|---|---|
| | f | 392.55 | 292.46 | 392.56 | 488.82 | 778.7 |
| | F number | 2.90 | 2.90 | 2.90 | 4.10 | 5.83 |
| | LD | 372.00 | 273.98 | 371.98 | 411.90 | 486.03 |
| | Dpi | 186.34 | 156.99 | 188.41 | 226.12 | 319.81 |
| (1) | LD/f | 0.948 | 0.937 | 0.948 | 0.843 | 0.624 |
| (2) | νdGp | 20.36 | 20.36 | 20.36 | 20.36 | 20.36 |
| | θgF_G1 | 0.6393 | 0.6393 | 0.6393 | 0.6393 | 0.6393 |
| | R11 | 68.57 | 59.72 | 86.70 | 95.69 | 577.17 |
| | R12 | 127.18 | 74.06 | 159.73 | 129.50 | 4707.88 |
| | fp | 158.84 | 306.80 | 204.61 | 391.00 | 736.46 |
| (7) | νdGn | 24.8 | 24.8 | 24.8 | 24.8 | 24.8 |
| | θgF_Gn | 0.6122 | 0.6122 | 0.6122 | 0.6122 | 0.6122 |
| | Dnp | 50.71 | 22.43 | 24.42 | 12.43 | 13.08 |
| | fn | −79.86 | −45.53 | −63.96 | −55.65 | −106.45 |
| (11) | νdGfp | 95.1 | 95.1 | 95.1 | 95.1 | 95.1 |
| | θgF_Gfp | 0.5373 | 0.5373 | 0.5373 | 0.5373 | 0.5373 |
| | Dpp | 53.98 | 24.88 | 27.57 | 14.88 | 16.43 |
| | ffp | 188.88 | 127.46 | 162.13 | 129.25 | 218.15 |
| (3) | ΔθgF_Gp | 0.0297 | 0.0297 | 0.0297 | 0.0297 | 0.0297 |
| (4) | Dpi/LD | 0.502 | 0.575 | 0.508 | 0.550 | 0.659 |
| (5) | (R12 − R11)/(R12 + R11) | 0.299 | 0.107 | 0.296 | 0.150 | 0.782 |
| (6) | fp/f | 0.405 | 1.049 | 0.521 | 0.800 | 0.946 |
| | ΔθgF_Gn | 0.0101 | 0.0101 | 0.0101 | 0.0101 | 0.0101 |
| (8) | Dnp/LD | 0.137 | 0.082 | 0.066 | 0.030 | 0.027 |
| (9) | −fn/f | 0.203 | 0.163 | 0.114 | 0.137 | 0.156 |
| (10) | −fn/fp | 0.503 | 0.148 | 0.313 | 0.142 | 0.145 |
| (12) | ΔθgF_Gfp | 0.053 | 0.053 | 0.053 | 0.053 | 0.053 |
| (13) | Dpp/LD | 0.145 | 0.091 | 0.074 | 0.036 | 0.034 |
| (14) | ffp/f | 0.481 | 0.436 | 0.413 | 0.264 | 0.280 |
| (15) | ffp/fp | 1.189 | 0.415 | 0.792 | 0.331 | 0.296 |

-continued unit mm

| | |
|---|---|
| focal length | 778.70 |
| F number | 5.83 |
| half field angle | 1.59 |
| image height | 21.64 |
| total lens length | 486.03 |
| BF | 71.54 |
| entrance pupil position | 834.02 |
| exit pupil position | −145.46 |
| front principal point position | −1181.64 |
| rear principal point position | −707.16 | single lens data

| lens | starting surface | focal length |
|---|---|---|
| 1 | 1 | 351.50 |
| 2 | 3 | 218.15 |
| 3 | 5 | −106.45 |
| 4 | 7 | 171.79 |
| 5 | 9 | 736.46 |

Next, an embodiment of a digital still camera (an image pickup apparatus) in which an optical system of the embodiment is employed as an image pickup optical system is described with reference to FIG. 11. In FIG. 11, the reference numeral 10 denotes a camera body, and 11 denotes an image pickup optical system constituted by the optical system described in any one of the first to the fifth embodiments. The reference numeral 12 denotes solid-state image pickup devices (photoelectric conversion devices), such as CCD sensors and CMOS sensors, which are incorporated in the camera body and receive an object image formed by the image pickup optical system 11.

By applying the optical system of the embodiment to an image pickup apparatus, such as a digital still camera, an image pickup device which is lightweight and of which various aberrations, such as a chromatic aberration, are desirably corrected can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109659 filed Jun. 1, 2016, which is hereby incorporated by reference herein in its entirety.

What is claimed is:

1. An optical system comprising:
   a positive lens Gp; and
   a focus unit configured to move during focusing and disposed closer to an image side than the positive lens Gp,
   wherein a front unit disposed closer to an object side than the positive lens Gp has positive refractive power as a whole, and
   wherein the following conditional expressions are satisfied:

$LD/f<1.00$;

$15.0<vdGp<24.0$;

$0.020<\theta gF\_Gp-0.6438+0.001682\times vdGp<0.100$;

$0.35<Dpi/LD<0.80$; and $0.05<(R12-R11)/(R12+R11)<0.80$, where vdGp is an Abbe number of a material for the positive lens Gp, $\theta gF\_Gp$ is a partial dispersion ratio of the material for the positive lens Gp, Dpi is a distance on an optical axis from an object-side lens surface of the positive lens Gp to an image surface, LD is a distance on the optical axis from a lens surface of the optical system closest to the object to the image surface, f is a focal length of the optical system, R11 is curvature radius of the object-side lens surface of the positive lens Gp, and R12 is a curvature radius of an image-side lens surface of the positive lens Gp.

2. The optical system according to claim 1, wherein, the following conditional expression is satisfied:

$0.30<fp/f<1.50$ where fp is a focal length of the positive lens Gp.

3. The optical system according to claim 1,
   wherein the front unit includes a negative lens Gn, and
   wherein the following conditional expression is satisfied:

$20.0<vdGn<45.0$ where vdGn is an Abbe number of a material for the negative lens Gn.

4. The optical system according to claim 3, wherein the negative lens Gn has a biconcave shape.

5. The optical system according to claim 3, wherein the negative lens Gn is a negative lens disposed closest to the object side among the negative lenses included in the optical system.

6. The optical system according to claim 3, wherein the following conditional expression is satisfied:

$0.015<Dnp/LD<0.20$ where Dnp is a distance on the optical axis between an image-side lens surface of the negative lens Gn and an object-side lens surface of the positive lens Gp.

7. The optical system according to claim 3, wherein the following conditional expression is satisfied:

$0.05<-fn/f<0.30$ where fn is a focal length of the negative lens Gn.

8. The optical system according to claim 3, wherein the following conditional expression is satisfied:

$0.10<-fn/fp<0.60$ where fp is a focal length of the positive lens Gp, and fn is a focal length of the negative lens Gn.

9. The optical system according to claim 1, wherein the front unit includes a positive lens Gfp which satisfies the following conditional expressions:

$73.0<vdGfp$;

and $0.030<\theta gF\_Gfp-0.6438+0.001682\times vdGfp<0.100$ where vdGfp is an Abbe number of a material for the positive lens Gfp, and $\theta gF\_Gfp$ is a partial dispersion ratio of the material for the positive lens Gfp.

10. The optical system according to claim 9, wherein, the positive lens Gfp is disposed second closest to the object side among positive lenses included in the front unit; and
    wherein the following conditional expression is satisfied:

$0.01<Dpp/LD<0.20$ where Dpp is a distance on the optical axis between an image-side lens surface of the positive lens Gfp and an object-side lens surface of the positive lens Gp.

11. The optical system according to claim 9, wherein the following conditional expression is satisfied:

$0.15<ffp/f<0.60$ where ffp is a focal length of the positive lens Gfp.

12. The optical system according to claim 9, wherein the following conditional expression is satisfied:

$0.20<ffp/fp<1.50$ where ffp is a focal length of the positive lens Gfp and fp is a focal length of the positive lens Gp.

13. An image pickup apparatus, comprising:
    an optical system; and
    an image pickup element configured to receive an image formed by the optical system,
    wherein the optical system including a positive lens Gp and a focus unit disposed closer to an image side than the positive lens Gp,
    wherein the focus unit is configured to move during focusing,
    wherein a front unit disposed closer to an object side than the positive lens Gp has positive refractive power as a whole, and
    wherein the following conditional expressions are satisfied:

$LD/f<1.00$;

$15.0<vdGp<24.0$;

$0.020<\theta gF\_Gp-0.6438+0.001682\times vdGp<0.100$;

$0.35<Dpi/LD<0.80$; and $0.05<(R12-R11)/(R12+R11)<0.80$, where vdGp is an Abbe number of a material for the positive lens Gp, $\theta gF\_Gp$ is a partial dispersion ratio of the material for the positive lens Gp, Dpi is a distance on an optical axis from an object-side lens surface of the positive lens Gp to an image surface, LD is a distance on the optical axis from a lens surface of the optical system closest to the object to the image surface, f is a focal length of the optical system, R11 is curvature radius of the object-side lens surface of the positive lens Gp, and R12 is a curvature radius of an image-side lens surface of the positive lens Gp.

\* \* \* \* \*